United States Patent Office 3,534,054
Patented Oct. 13, 1970

1

3,534,054
3,6-DIOXO-2-AZA-9,11,14-TRIOXADISPIRO
[4.1.5.3] PENTADECANE
Herschel D. Porter, Indianapolis, Ind., assignor to Eli
Lilly and Company, Indianapolis, Ind., a corporation
of Indiana
No Drawing. Filed Feb. 5, 1968, Ser. No. 702,820
Int. Cl. C07d 31/44
U.S. Cl. 260—295                                        1 Claim

ABSTRACT OF THE DISCLOSURE

Novel substituted dispiropentadecanes having activity as central nervous system depressants, vasodilators, anti-inflammatory agents in animals, and as soil fungicides.

This invention relates to novel substituted dispiropentadecanes of the formula:

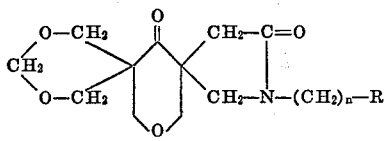

wherein

R is monocyclic aryl, $C_1$–$C_3$ alkoxy, or di($C_1$–$C_3$ alkyl)-amino;
and $n$ is 0, 1, 2, or 3.
Monocyclic aryl is phenyl, pyridyl, or thienyl.
$C_1$–$C_3$ alkoxy is methoxy, ethoxy, n-propoxy, or isopropoxy.
$C_1$–$C_3$ alkyl is methyl, ethyl, n-propyl or isopropyl.

While the compounds of the present invention have been defined in terms of a structural formula which depicts the novel structural features of the claimed compounds and which indicates the presence therein of certain well-known organic radicals, including alkyl, phenyl, pyridyl, and thienyl, it will be recognized by those skilled in the art that such radicals may bear one or more substituents without departing in any way from the spirit of the invention and without altering the properties of the novel compounds in such a way as would set them apart from the invention or take them outside its scope. Compounds having the novel structure of the present invention and bearing such substituents are accordingly to be considered to lie within the scope of the invention. Among such substituent atoms and radicals are halo, $C_1$–$C_3$ alkyl, methoxy, methylmercapto, trifluoromethyl, and the like.

It is an object of this invention to provide novel substituted dispiropentadecanes possessing surprising and unexpected activity as central nervous system depressants, vasodilators, soil fungicides, and anti-inflammatory agents.

The novel compounds of this invention thus are found to be useful in a number of areas. One compound, 2-(2-chlorobenzyl) - 3,6 - dioxo - 2-aza-9,11,14-trioxadispiro [4.1.5.3]pentadecane, has been found to possess anti-inflammatory activity when administered subcutaneously to rats at a dose of 100 mg./kg. of body weight. Others of the series, e.g., 3,6-dioxo-2-(2-pyridyl)-9,11,14-trioxo-2-azadispiro[4.1.5.3]pentadecane and 2-(4-chlorobenzyl)-3,6 - dioxo - 2-aza-9,11,14-trioxadispiro[4.1.5.3]pentadecane, show unexpected and surprising activity as soil fungicides when tested against Rhizoctonia solani, the causative organism of Rhizoctonia damping-off in cotton; Pythium spp., the causative organism of Pythium damping-off in cotton; and against Verticilium albo-atrum, the causative agent of Verticilium wilt, when applied at rates of from about 10 to about 40 pounds per acre.

The novel compound 2-benzyl-3,6-dioxo-2-aza-9,11,14-trioxadispiro[4.1.5.3]pentadecane, when administered intraperitoneally to mice at dosages of from 100 to 800 mg./kg., showed activity as a central nervous system depressant and a vasodilator.

The novel compounds of this invention are prepared by the reaction of 3,6-dioxo-2,9,11,14-tetraoxapentadecane with an appropriate primary amine at a temperature sufficiently high and for a time sufficiently long to bring about substantially complete reaction. Temperatures in the range of from about 100 to about 180° C. have been found suitable. Time for completion of the reaction ranges from about 3 hours to about 24 hours, the shorter time being at the lower temperature. Overlong heating tends to cause decomposition of the product; and therefor, the preferred time of reaction is about 15 to 20 hours.

Suitable amines include benzylamine, veratrylamine, homoveratrylamine, 2-chlorobenzylamine, 4-chlorobenzylamine, 2-pyridylamine, 3-pyridylamine, 4-methylbenzylamine, 3 - methoxypropylamine, 2 - dimethylaminoethylamine, 3-pyridylmethylamine, α-methylbenzylamine, 2-thienylamine, 2-thienylmethylamine, and the like. The 3,6-dioxo-2,9-11,14-tetraoxapentadecane is prepared by the method of S. Olsen et al., Ann. 635, 61(1960).

The following example demonstrates the preparation of the novel compounds of this invention but is not to be considered as limiting the scope thereof.

EXAMPLE 2-benzyl-3,6-dioxo-2-aza-9,11,14-trioxadispiro
[4.1.5.3]pentadecane

A mixture of 60.5 g. (0.25 mole) of 3,6-dioxo-2,9,11,14-tetraoxapentadecane and 54.6 g. (0.50 mole) of benzylamine was heated in an oil bath maintained at a temperature of about 140 to 150° C. for about 20 hours. The excess benzylamine was removed in vacuo. The residue was twice recrystallized from 400 ml. ethyl acetate to yield white platelets weighing about 46.4 g., having a melting point of about 147 to 149° C., and identified elemental analysis as 2-benzyl-3,6-dioxo-2-aza-9,11,14-trioxadispiro[4.1.5.3]pentadecane.

Following the same general procedure as described above but using appropriate starting materials, the following compounds were prepared:

2 - (2 - chlorobenzyl) - 3,6 - dioxo - 2 - aza - 9,11,14-trioxadispiro[4.1.5.3]pentadecane. Melting point: 130.5–132.5° C.

3,6 - dioxo - 2-(2-pyridyl)-9,11,14-trioxa-2-azadispiro-[4.1.5.3]pentadecane. Melting point: 215–217° C.

2 - (4 - chlorobenzyl)-3,6-dioxo-2-aza-9,11,14-trioxadispiro[4.1.5.3]pentadecane. Melting point: 123–125° C.

2 - (4 - methylbenzyl)-3,6-dioxo-2-aza-9,11,14-trioxadispiro[4.1.5.3]pentadecane. Melting point: 169–171° C.

3,6 - dioxo - 2-(3-pyridylmethyl)-2-aza-9,11,14-trioxadispiro[4.1.5.3]pentadecane. Melting point: 153–155° C.

3,6 - dioxo - 2 - veratryl-2-aza-9,11,14-trioxadispiro [4.1.5.3]pentadecane. Melting point: 154–156° C.

2 - (3,4-dimethoxyphenethyl)-3,6-dioxo-2-aza-9,11,14-trioxadispiro[4.1.5.3]pentadecane. Melting point: 155–156° C.

2 - (3 - dimethylaminopropyl)-3,6-dioxo-2-aza-9,11,14-trioxadispiro[4.1.5.3]pentadecane. Melting point: 123–125° C.

2 - (3 - methoxypropyl)-3,6-dioxo-2-aza-9,11,14-trioxadispiro[4.1.5.3]pentadecane. Melting point: 101–103° C.

dl 2 - (α-methylbenzyl)-3,6-dioxo-2-aza-9,11,14-trioxadispiro[4.1.5.3]pentadecane. Melting point: oil.

I claim:
1. The compound, 3,6 - dioxo - 2-(2-pyridyl)-9,11,14-trioxa-2-azadispiro[4.1.5.3]pentadecane.

References Cited

UNITED STATES PATENTS 3,257,398  6/1966  Grogan et al. _____ 260—295 XR

ALAN L. ROTMAN, Primary Examiner

U.S. Cl. X.R.

260—326.5; 424—266, 274